(12) United States Patent
Lin et al.

(10) Patent No.: US 9,121,384 B2
(45) Date of Patent: Sep. 1, 2015

(54) VERTICAL AXIS WIND TURBINE

(71) Applicants: Chun-Shuan Lin, Zhubei (TW); Jung-Hsi Su, Zhubei (TW)

(72) Inventors: Chun-Shuan Lin, Zhubei (TW); Jung-Hsi Su, Zhubei (TW)

( * ) Notice: Subject to any disclaimer, the term of this patent is extended or adjusted under 35 U.S.C. 154(b) by 67 days.

(21) Appl. No.: 13/924,915

(22) Filed: Jun. 24, 2013

(65) Prior Publication Data

US 2014/0375060 A1    Dec. 25, 2014

(51) Int. Cl.
F03D 3/00    (2006.01)
F03D 9/00    (2006.01)
F03D 3/04    (2006.01)

(52) U.S. Cl.
CPC .............. F03D 3/005 (2013.01); F03D 3/0409 (2013.01); F03D 9/002 (2013.01); *F05B 2220/7066* (2013.01)

(58) Field of Classification Search
CPC ....... F03D 3/005; F03D 9/002; F03D 3/0409; F03D 3/0427
USPC ..................................................... 290/44, 55
See application file for complete search history.

(56) References Cited

U.S. PATENT DOCUMENTS

| | | | | |
|---|---|---|---|---|
| 4,115,027 A * | 9/1978 | Thomas | ......................... | 415/53.1 |
| 4,245,958 A * | 1/1981 | Ewers | ......................... | 416/197 A |
| 4,486,143 A * | 12/1984 | McVey | ......................... | 415/164 |
| 4,545,729 A * | 10/1985 | Storm | ......................... | 416/132 B |
| 4,725,194 A * | 2/1988 | Bartsch | ......................... | 415/4.2 |
| 5,380,149 A * | 1/1995 | Valsamidis | ..................... | 415/2.1 |
| 5,463,257 A * | 10/1995 | Yea | .................................. | 290/55 |
| 6,465,899 B2 * | 10/2002 | Roberts | ............................ | 290/44 |
| 6,740,989 B2 * | 5/2004 | Rowe | .................................. | 290/55 |
| 6,857,846 B2 * | 2/2005 | Miller | ............................. | 415/4.2 |
| 7,329,965 B2 * | 2/2008 | Roberts et al. | ................... | 290/55 |
| 7,345,375 B2 * | 3/2008 | Joo | .................................. | 290/55 |
| 7,397,144 B1 * | 7/2008 | Brostmeyer et al. | ........... | 290/53 |
| 7,633,177 B2 * | 12/2009 | Platt | .................................. | 290/54 |
| 7,866,938 B2 * | 1/2011 | Kariya | ............................. | 415/4.4 |
| 8,232,664 B2 * | 7/2012 | Stroup et al. | ..................... | 290/55 |
| 8,534,987 B2 * | 9/2013 | Coffey | ............................ | 415/4.2 |
| 8,591,171 B1 * | 11/2013 | Maynard | ........................ | 415/4.2 |
| 2009/0289459 A1 * | 11/2009 | Chung | ............................. | 290/55 |
| 2010/0148516 A1 * | 6/2010 | Buhtz | .............................. | 290/55 |
| 2010/0213722 A1 * | 8/2010 | Scott | ............................... | 290/55 |
| 2010/0254808 A1 * | 10/2010 | Kim et al. | .................. | 415/208.1 |
| 2010/0296913 A1 * | 11/2010 | Lee | ................................ | 415/4.2 |

(Continued)

FOREIGN PATENT DOCUMENTS

WO    WO 2012026879 A1 *    3/2012

*Primary Examiner* — Tulsidas C Patel
*Assistant Examiner* — Viet Nguyen
(74) *Attorney, Agent, or Firm* — Jackson IPG PLLC; Demian K. Jackson (57) ABSTRACT

A vertical axis wind turbine includes a wind guide module installed at the periphery of a vane module for turning axially, and a magnetic field module and a coil module installed at the periphery of a turntable of the vane module for generating induced electromotive forces, such that when the vane module is rotated by the action of air current, the magnetic field module is driven to rotate a coil of the coil module generates an electric current by the magnetic induction of the magnetic element of the magnetic field module. In particular, the whole vertical axis power generator can guide and concentrate the surrounding air current at flaps of the vane module by the action of the wind guide module, so that the vane module is capable of starting an operation easily, providing a high operating performance, and featuring an easy manufacture.

5 Claims, 6 Drawing Sheets

(56) References Cited

U.S. PATENT DOCUMENTS

| | | |
|---|---|---|
| 2012/0091727 A1* | 4/2012 | Tsitron .......................... 290/55 |
| 2012/0119504 A1* | 5/2012 | Vigaev ........................... 290/55 |
| 2012/0201666 A1* | 8/2012 | Curtis ......................... 415/208.1 |
| 2012/0213630 A1* | 8/2012 | Alfonsi ....................... 415/182.1 |
| 2013/0113217 A1* | 5/2013 | Vaz ................................ 290/55 |
| 2013/0307276 A1* | 11/2013 | Ko .................................. 290/55 |
| 2014/0044521 A1* | 2/2014 | Bae .................................. 415/7 |

* cited by examiner

VERTICAL AXIS WIND TURBINE

FIELD OF THE INVENTION

The present invention relates to a wind turbine for electric power generation, in particular to the vertical axis wind turbine capable of starting an operation easily, providing a high operating performance, and featuring an easy manufacture.

BACKGROUND OF THE INVENTION

Fuels and electricity become increasingly expensive due to the petrochemical energy shortage, and people pay more attention to the importance of environmental protection due to the greenhouse effect of the earth, and power saving and carbon reduction become an urgent and important issue of the related industry. To overcome the future energy problems, each country aggressively develops substitute energy sources, particularly pollution-free green energies and power generations such as hydroelectric generation, wind generation, solar generation and tidal generation of electricity by using natural forces.

Since the wind generation is inexhaustible and involves less pollution and complies with the concept of environmental protection, wind generation equipments for driving a vane module of a power generator to operate is mainly divided into two types, respectively: a horizontal axis wind turbine (HAWT) and a vertical axis wind turbine (VAWT). However, the vane length and the tower height of a general horizontal axis wind turbine reach up to tens of meters, not only having the disadvantages of a complicated structure, a high equipment cost, and a severe installation environment condition, but also causing noises and nuisances to the neighborhood during the power generation. The HAWT power generation systems gradually shift from land to sea, since it is not easy to obtain the installation locations on land. In non-monsoon or maritime climatic areas, the horizontal axis wind turbine cannot become popular or maximize the advantages of green energy.

Compared with the horizontal axis wind turbine, the vertical axis wind turbine has the advantages of small volume, low manufacturing cost, low threshold wind speed, small noise and little light pollution, so that the VAWT power generation systems have a broader prospect of market applications. In recent years, many compact VAWT wind generation equipments are introduced to the market.

Similar to the conventional vertical axis wind turbine, the vertical axis wind turbine comprises a rotary base with an axis of rotation, and a plurality of flaps disposed around the periphery of the base for receiving the effect of air current to produce the kinetic power of driving and rotating the base, and the effect of whether to concentrate the surrounding air current at the flaps is a key factor of affecting the operating performance of the vertical axis wind turbine. Therefore, most of the conventional vertical axis wind turbine can improve the operating performance by changing the shape of the flaps.

However, the design of the flap will tend to be developed with a large size and high complexity, not only increasing the level of difficulty of manufacturing the flaps, but also increasing the weight of the rotated vertical axis wind turbine significantly. As a result, the difficulty of starting the rotation is increased, and the improvement of the performance is very limited.

SUMMARY OF THE INVENTION

In view of the aforementioned drawbacks of the prior art, it is a primary objective of the present invention to provide vertical axis wind turbine capable of starting an operation easily, providing a high operating performance, and featuring an easy manufacture.

To achieve the aforementioned objective, the present invention provides a vertical axis wind turbine, comprising: a vane module, a wind guide module, a magnetic field module, and a coil module; wherein the vane module has a turntable for turning axially, a plurality of flaps coupled to the top of the turntable and disposed with an predetermined interval apart from one another and around the turntable, and a center shaft disposed at the center position of the vane module; the wind guide module has a plurality of baffles installed around the external periphery of the flaps and maintaining a predetermined interval from the flaps, a set of a stand for mounting the baffles, and the set of the stand having an upper frame, a lower frame, a plurality of link rods coupled between the upper frame and the lower frame, and a plurality of footers installed at the lower frame; the magnetic field module has a plurality of magnetic elements fixed along an edge of the turntable; and the coil module is electrically coupled to the external periphery of the turntable and maintaining a predetermined interval from the magnetic elements.

With the aforementioned structure and characteristics, the vertical axis wind turbine of the present invention can be installed at a position for receiving an air current during use, and the coil module is electrically coupled to a power supplying object, so that when the vane module is rotated by the action of the air current, the magnetic field module is driven to rotate to produce a relative motion of the magnetic element and the coil, and the coil produces an electric current by the magnetic induction of the magnetic element. Particularly, the vertical axis power generator can guide and concentrate the surrounding air current at relative positions of the flaps at the inner ring by the action of the wind guide module, so that the vane module can be started easily to obtain a better operating performance, and the invention can skip the complicated structural design of the flaps for an easier manufacture of the vertical axis wind turbine.

More specifically, the vertical axis wind turbine of the present invention can guide and concentrate the surrounding air current at relative positions of the flaps at the inner ring, not only skipping the complicated structural design of the flaps for an easier manufacture and decreasing the weight of the vane module for an easy start of the operation and a better operating performance, but also integrating the magnetic field module onto the turntable of the vane module directly to reduce the overall volume of the vertical axis wind turbine significantly in order to overcome the environment limitations of installing the vertical axis wind turbine.

DESCRIPTION OF THE PREFERRED EMBODIMENTS

The aforementioned and other objectives and advantages of the present invention will become clearer in light of the following detailed description of an illustrative embodiment of this invention described in connection with the drawings. It is intended that the embodiments and drawings disclosed herein are to be considered illustrative rather than restrictive.

Figure 1:
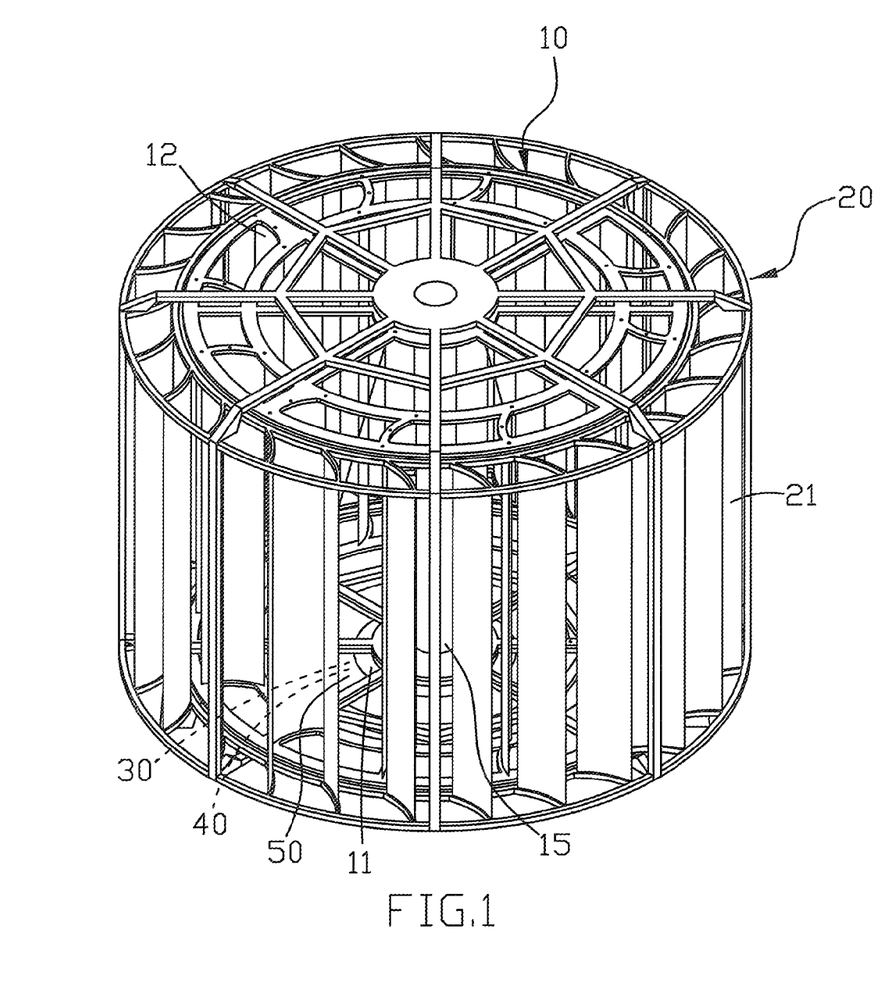
FIG. 1 is a perspective view of a vertical axis wind turbine in accordance with a first preferred embodiment of the present invention.
Figure 2:
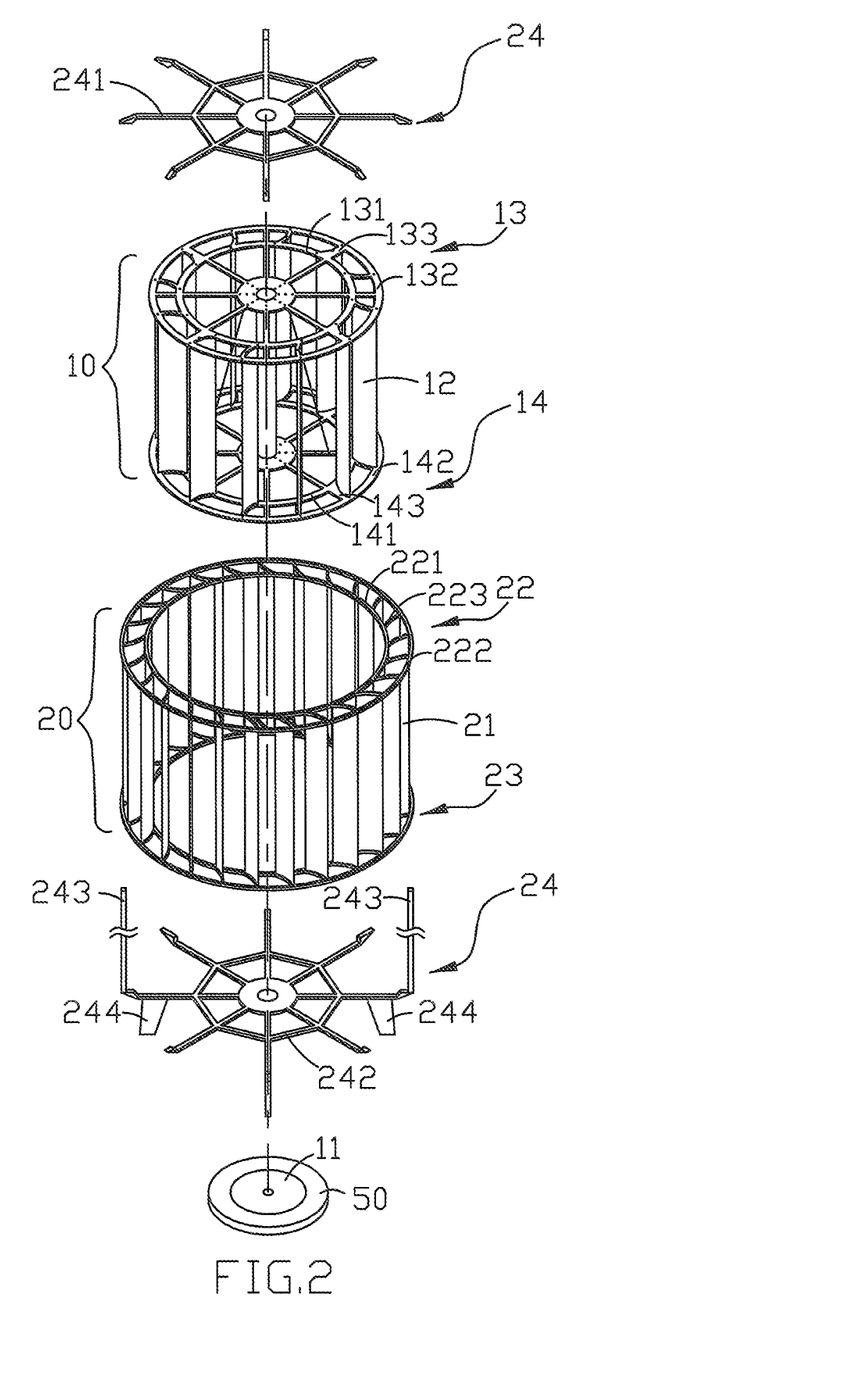
FIG. 2 is an exploded view of a vertical axis wind turbine in accordance with the first preferred embodiment of the present invention.
Figure 3:
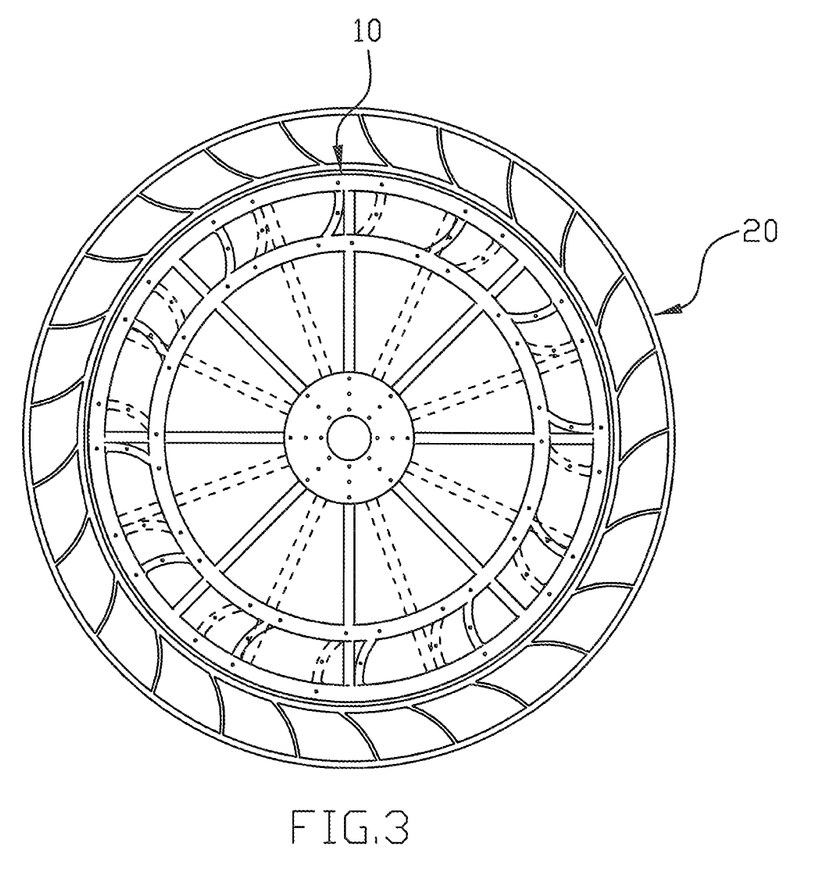
FIG. 3 is a top view of a vertical axis wind turbine in accordance with the first preferred embodiment of the present invention.

With reference to FIGS. 1 to 3 for a perspective view, an exploded view and a top view of a vertical axis wind turbine in accordance with the first preferred embodiment of the present invention respectively, the vertical axis wind turbine comprises a vane module 10, a wind guide module 20, a magnetic field module 30, and a coil module 40.

The vane module 10 has a turntable 11 for turning axially, a plurality of flaps 12 installed at the top of the turntable 11 and disposed with a predetermined interval apart from each other around the turntable 11, and a center shaft 15 disposed at the center position of the vane module 10 for increasing the structural stability of the whole vane module 10. In a preferred embodiment as shown in FIGS. 1 and 3, the vane module 10 has a first upper frame body 13 coupled to the top of all flaps 12, a first lower frame body 14 for coupling the bottom of all flaps 12, and the first upper frame body 13 is comprised of an inner ring 131 and an outer ring 132, and a support bar 133 is coupled between the inner ring 131 and the outer ring 132 for installing the flaps 12, and the first lower frame body 14 is comprised of an inner ring 141 and an outer ring 142, and support bar 143 is coupled between the inner ring 141 and the outer ring 142 for installing the flaps 12, and the first upper frame body 13 and the first lower frame body 14 are coupled to the center shaft 15.

The wind guide module 20 has a plurality of baffle 21 installed at the external periphery of the flaps 12 and maintaining a predetermined interval from the flaps 12, and the wind guide module 20 has a set of a stand 24 for fixing the baffles 21, and the stand 24 has an upper frame 241, a lower frame 242, and a plurality of link rods 243 coupled between the upper frame 241 and the lower frame 242, wherein the upper frame 241 and the lower frame 242 are in an octagonal shape, and a plurality of footers 244 is installed at the lower frame 242. In the preferred embodiment as shown in FIGS. 1 and 2, the wind guide module 20 has a second upper frame body 22 for coupling the top of all baffles 21 and a second lower frame body 23 for coupling the bottom of all baffles 21, and the second upper frame body 22 is comprised of an inner ring 221 and an outer ring 222, and a support bar 223 is coupled between the inner ring 221 and the outer ring 222 for installing the baffles 21; the second lower frame body 23 is comprised of an inner ring 231 and an outer ring 232, and a support bar 233 is coupled between the inner ring 231 and the outer ring 232 for installing the baffles 21; and the upper frame 241 and the lower frame 242 of the set of the stand 24 are coupled to the second upper frame body 22 and the second lower frame body 23 respectively.

The magnetic field module 30 has a plurality of magnetic elements 31 fixed to an edge of the turntable 11, and the coil modules 40 has a plurality of coils 41 electrically coupled to the external periphery of the turntable 11 and maintaining a predetermined interval from the magnetic element 311. In the preferred embodiment, the magnetic element 31 of the magnetic field module 30 is a permanent magnet.

In an embodiment of the vertical axis wind turbine of the present invention, the turntable of the vane module is axially installed on a main structural body of an installation location, and the wind guide module is fixed to the external periphery of the vane module relative to the main structural body of the installation location, and the magnetic field module and the coil module are installed for performing a wind generation.

Of course, the vertical axis wind turbine of the present invention as shown in FIGS. 1 and 2 can further comprise a bezel 50, wherein the turntable 11 of the vane module 10 is axially installed at the center position of the bezel 50 and rotated with respect to the bezel 50. The bezel 50 has an accommodating space 51 for accommodating the turntable 11, and the coils 41 of the coil module 40 can be mounted onto a sidewall of the accommodating space 51 of the bezel 50 to reduce the total volume of the vertical axis wind turbine significantly, so as to overcome the environment limitations of installing the vertical axis wind turbine.

Figure 4:
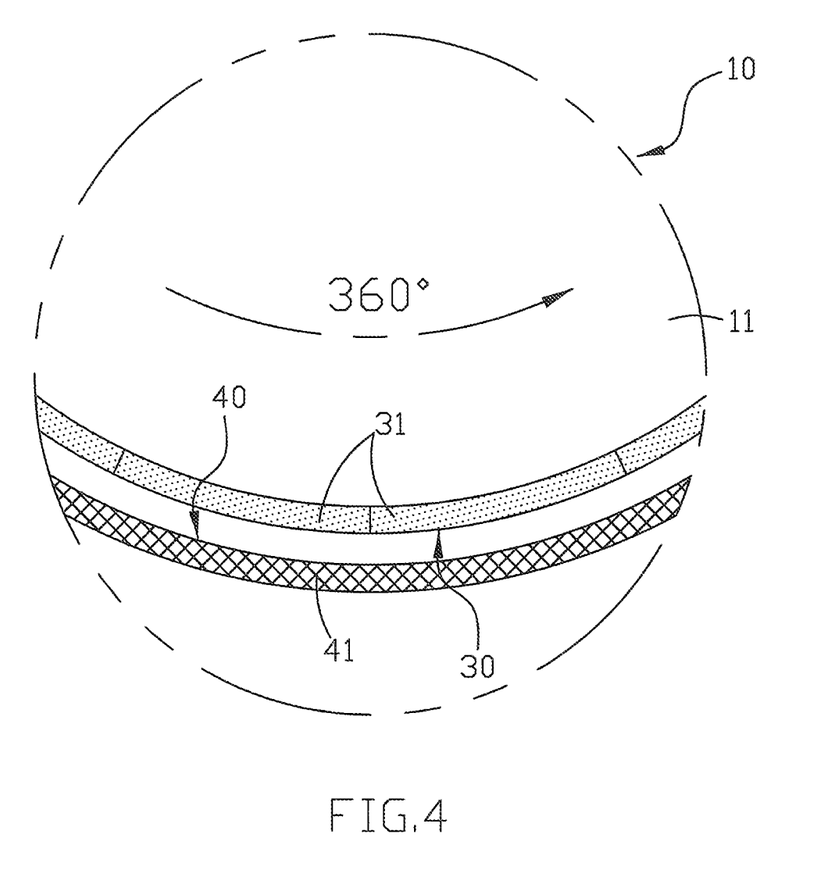
FIG. 4 is a schematic view showing the relative positions of a magnetic field module and a coil module of the present invention.

In an application of the vertical axis wind turbine of the present invention, the vertical axis wind turbine is installed at a position capable of receiving the action of air current, and the coil module is electrically coupled to a power supplying object, so that when the vane module 10 is rotated by the action of the air current, the magnetic field module 30 can be driven to rotate, and the magnetic element 31 and the coil 41 produce relative motions (as shown in FIG. 4), and the coils 41 produce an electric current by the magnetic induction of the magnetic element. Particularly, the vertical axis power generator under the action of the wind guide module 20 guides and concentrates the surrounding air current at relative positions of the flaps 12 at the inner ring, so that the vane module 10 can be started and operated easily to obtain a better operating performance. In addition, the complicated structural design of the flaps 10 can be skipped to make the manufacture of the vertical axis wind turbine easier.

Figure 5:
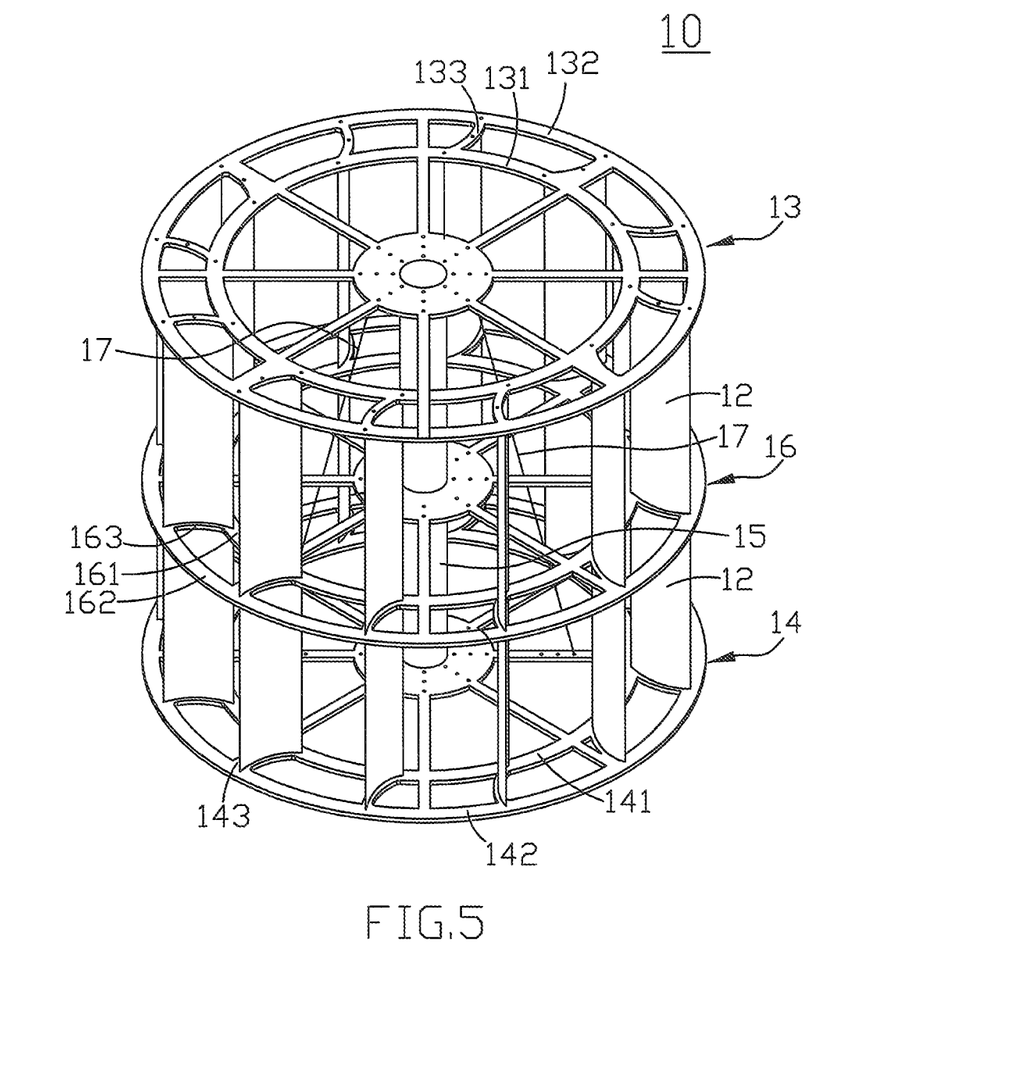
FIG. 5 is a perspective view of a vane module in accordance with a second preferred embodiment of the present invention.
Figure 6:
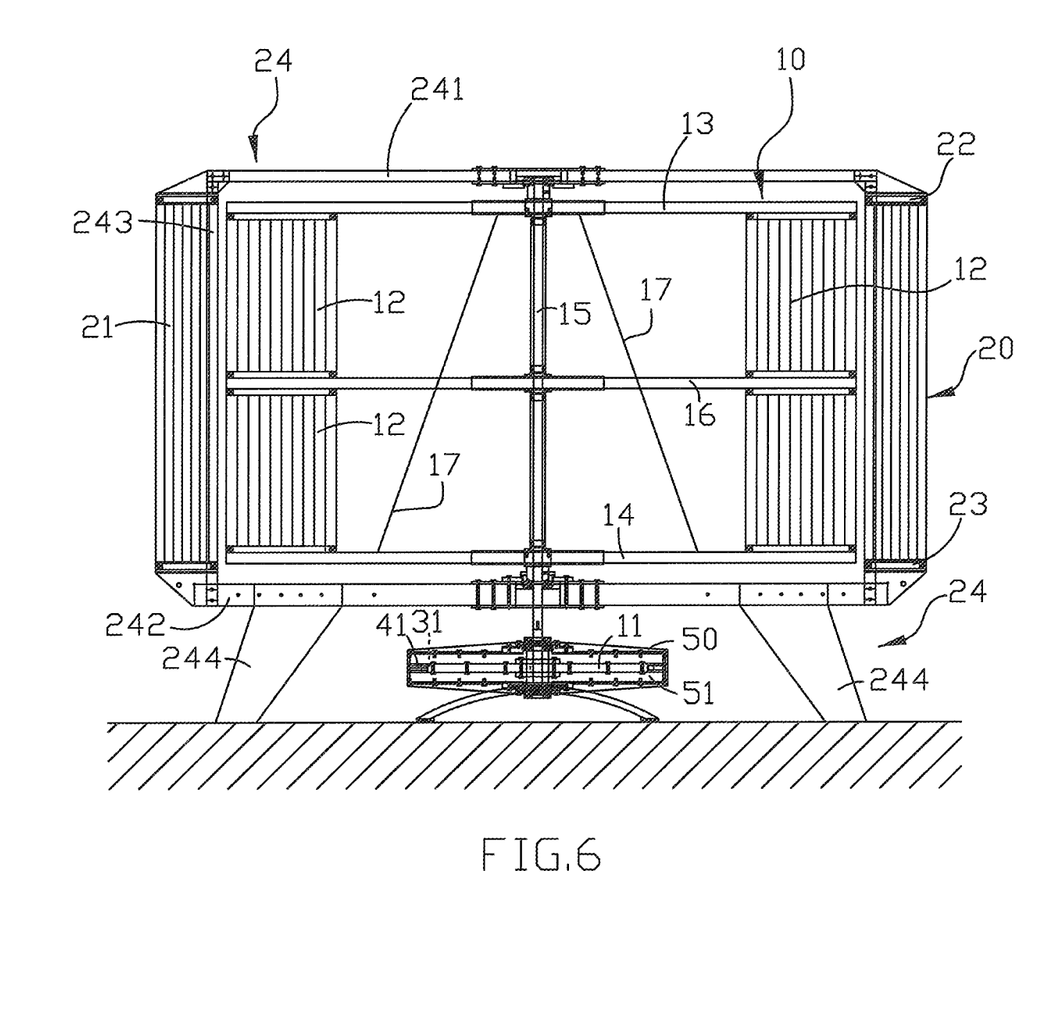
FIG. 6 is a cross-sectional view of a vertical axis wind turbine in accordance with the second preferred embodiment of the present invention.

In a preferred embodiment of a vertical axis wind turbine of the present invention as shown in FIGS. 5 and 6, the vane module 10 has the first upper frame body 13 for coupling the top of all flaps 12 and the first lower frame body 14 for coupling the bottom of all flaps 12, as well as having at least one connecting frame body 16 installed between the first upper frame body 13 and the first lower frame body 14 for coupling all flaps 12. Similarly, the first upper frame body 13 is comprised of an inner ring 131 and an outer ring 132, and a support bar 133 is installed between the inner ring 131 and the outer ring 132 for installing the flaps 12. The first lower frame body 14 is comprised of an inner ring 141 and an outer ring 142, and a support bar 143 is coupled between the inner ring 141 and the outer ring 142 for installing the flaps 12. The at least one connecting frame body 16 is comprised of an inner ring 161 and an outer ring 162, and a support bar 163 is coupled between the inner ring 161 and the outer ring 162 for installing the flaps 12. Similarly, the first upper frame body 13, the at least one connecting frame body 16, and the first lower frame body 14 are coupled to the center shaft 15 to enhance the overall structural stability of the vane module 10.

Of course, the vane module 10 of the vertical axis wind turbine of the present invention can have plurality of cables 17 installed between the first upper frame body 13 and the first lower frame body 14 regardless of whether or not the vane module 10 has the at least one connecting frame body 16 installed between the first upper frame body 13 and the first lower frame body 14 for coupling all flaps 12. When the vertical axis wind turbine is operated, the tension and the outwardly extending angle of all cables 17 can be adjusted to achieve the effect of maintaining the structural strength of the vane module 10.

In the vertical axis wind turbine of the present invention as shown in FIGS. 2 and 6, the wind guide module 20 has a second upper frame body 22 for coupling the top of all baffles 21 and a second lower frame body 23 for coupling the bottom of all baffles 21. The second upper frame body 22 is comprised of an inner ring 221 and an outer ring 222, and a support bar 223 is coupled between the inner ring 221 and the outer ring 222 for installing the baffles 21. The second lower frame body 23 is comprised of an inner ring 231 and an outer ring 232, and a support bar 233 is coupled between the inner ring 231 and the outer ring 232 for installing the baffles 21. The vertical axis wind turbine further has a set of a stand 24 for fixing the wind guide module 20, and the set of the stand 24 has an upper frame 241 coupled to the second upper frame body 22, a lower frame 242 coupled to the second lower frame body 23, a plurality of link rods 243 coupled between the upper frame 241 and the lower frame 242, and a plurality of footers 244 disposed at the lower frame 242, so as to enhance the overall structural strength of the vertical axis wind turbine, and facilitate the installation flexibly.

It is noteworthy that the vertical axis wind turbine of the present invention uses the wind guide module 20 to guide and concentrate the surrounding air current at the flaps 12 at the inner ring to produce an aerodynamic effect, so as to simplify the structural design of the flaps 12 significantly. Basically, each flap 12 is an aluminum extrusion strip with a predetermined length, and each baffle 21 is an aluminum extrusion strip with a predetermined length to produce the aerodynamic effect, not only reducing the material and manufacturing cost significantly, but also assisting the reduction of the total weight of the vertical axis wind turbine.

In actual experiments, each flap 12 has an aluminum extrusion cross-section which is an arc cross-section with a predetermined curvature, and each baffle 21 has an aluminum extrusion cross-section which is an arc cross-section with a predetermined curvature, and the wind guide module 20 has the same number of flaps 12 as the number of baffles 21 to achieve the effects of better efficiency and quieter operation.

Compared with the conventional structures, the vertical axis wind turbine of the present invention can guide and concentrate the surrounding air current at the flaps at the inner ring under the action of the wind guide module, not only skipping the complicated structural design of the flaps to make the manufacture of the vertical axis wind turbine easier, but also reducing the total weight of the vane module to provide an easier start of the operation and a better operating performance, as well as integrating the magnetic field module onto the turntable of the vane module directly to reduce the total volume of the vertical axis wind turbine and overcome the environment limitations of installing the vertical axis wind turbine.

While the invention has been described by means of specific embodiments, numerous modifications and variations could be made thereto by those skilled in the art without departing from the scope and spirit of the invention set forth in the claims.

What is claimed is:

1. A vertical axis wind turbine, comprising: a vane module, having a turntable for turning axially, a plurality of flaps disposed with a predetermined interval apart from one another and around the turntable, a center shaft disposed at the center position of the vane module, a first upper frame body for coupling the top of all the flaps, a first lower frame body for coupling the bottom of all the flaps, a plurality of adjustable cables coupled between the first upper frame body and the first lower frame body, and at least one connecting frame body installed between the first upper frame body and the first lower frame body and coupled to all flaps; wherein the first upper frame body is comprised of an inner ring, an outer ring, and a support bar coupled between the inner ring and the outer ring for installing the flaps, and the first lower frame body is comprised of an inner ring, an outer ring, and a support bar coupled between the inner ring and the outer ring for installing the flaps, and the at least one connecting frame body is comprised of an inner ring, an outer ring, and a support bar coupled between the inner ring and the outer ring for installing the flaps; wherein, the first upper frame body, the at least one connecting frame body, and the first lower frame body are coupled to the center shaft;
a wind guide module, having a plurality of baffles installed around the external periphery of the flaps and maintaining a predetermined interval from the flaps, a set of a stand for mounting the baffles, and the set of the stand having an upper frame, a lower frame, a plurality of link rods coupled between the upper frame and the lower frame, and a plurality of footers installed at the lower frame, wherein the wind guide module has a second upper frame body for coupling the top of all baffles, and a second lower frame body for coupling the bottom of all baffles, wherein the second upper frame body is comprised of an inner ring, an outer ring, and a support bar coupled between the inner ring and the outer ring for installing the baffles, and the second lower frame body is comprised of an inner ring, an outer, and a support bar coupled between the inner ring and the outer ring for installing the baffles, wherein the upper frame and the lower frame of the set of the stand are coupled to the second upper frame body and the second lower frame body respectively;
a magnetic field module, having a plurality of magnetic elements fixed along an edge of the turntable; and
a coil module, having a plurality of coils electrically coupled to the turntable, wherein the coil module is arranged coaxially around the magnetic field module to maintain a predetermined interval from the magnetic elements,
wherein the vane module and wind guide modules have separate frame bodies.

2. The vertical axis wind turbine of claim 1, further comprising a bezel, and the turntable of the vane module being axially installed at the center position of the bezel and rotating with respect to the bezel, and the bezel having an accommodating space for accommodating the turntable, and the coil of the coil module being fixed onto a sidewall of the accommodating space of the bezel.

3. The vertical axis wind turbine of claim 1, wherein each flap is an aluminum extrusion strip with a predetermined length, and each baffle is an aluminum extrusion strip with a predetermined length.

4. The vertical axis wind turbine of claim 3, wherein each flap has an aluminum extrusion cross-section which is an arc cross-section with a predetermined curvature, and each baffle has an aluminum extrusion cross-section which is an arc cross-section with a predetermined curvature.

5. The vertical axis wind turbine of claim 1, wherein the upper frame and the lower frame of the set of the stand is in an octagonal shape.

* * * * *